D. N. MARTIN.

Stove-Doors.

No. 5.405. Reissued May 13, 1873.

WITNESSES

B. M. Williams

E. F. Ober

David N. Martin

By his Attys

Henry W. Williams & Co

AM. PHOTO-LITHOGRAPHIC CO. N.Y. (OSBORNE'S PROCESS.)

UNITED STATES PATENT OFFICE.

DAVID N. MARTIN, OF LAWRENCE, MASSACHUSETTS, ASSIGNOR TO D. N. AND C. M. MARTIN.

IMPROVEMENT IN STOVE-DOORS.

Specification forming part of Letters Patent No. 116,334, dated June 27, 1871; reissue No. 5,405, dated May 13, 1873; application filed June 20, 1872.

*To all whom it may concern:*

Be it known that I, DAVID N. MARTIN, of Lawrence, in the county of Essex and State of Massachusetts, have invented a new and useful Improvement in connection with Stoves, Furnaces, &c., of which the following, when taken in connection with the accompanying drawing, is a full and exact specification.

My invention relates to the door or other device for creating the draft below the grate; and consists in facing the door and that part of the furnace or stove against which it strikes and closes with non-corrosive metal around the edge, thus making a tight connection.

Figure 1:
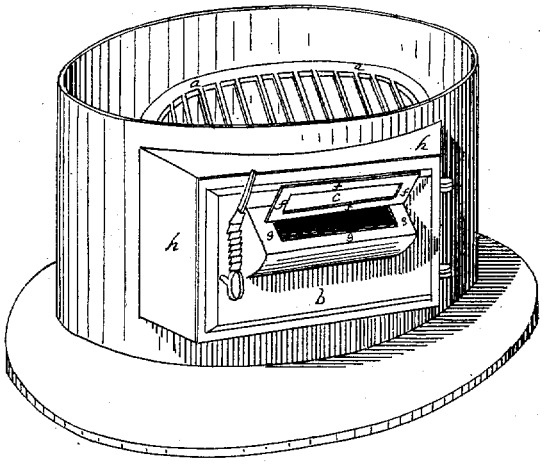
Figure 2:
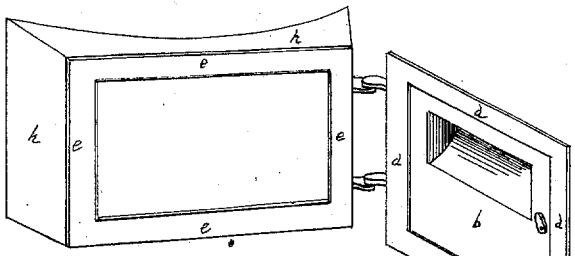
Figure 3:
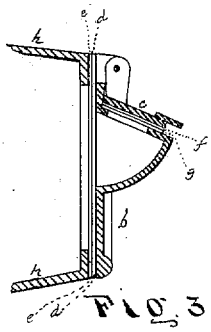

In the accompanying drawing, Figure 1 is a view of the lower part of a furnace embodying my invention. Fig. 2 is a detached view of front side of the lower part, with the large door open. Fig. 3 is a vertical section of the same, with the large door shut.

*a* is the grate. *b* is the large door. *c* is the small door, used more particularly in regulating the draft. *d* is a rim or facing of brass or other non-corrosive metal upon the inside of the door *b*. *e* is a similar facing upon the furnace, fitting the rim *d*. *f* is a rim or facing of brass or other non-corrosive metal upon the inside of the door *c*. *g* is a similar facing fitting to the rim *f*. *h* is a part of the main body of the furnace.

My invention is especially valuable in furnaces, as they are more subject to dampness than stoves usually are.

It is believed that if the opening in front of the furnace be properly arranged, no opening whatever is needed behind the furnace to check the draft.

I am of the opinion that my invention will regulate a fire in this manner, thus preventing all possibility of the escape of gas, which is very apt to be the case by the old method of an opening in the flue.

It is impossible to regulate a fire in this manner when simple cast-iron doors are used, as doors made in this manner are subject to rust and corrosion. In the accompanying drawing two doors are shown which are constructed in this manner.

The ash-door *b* is constructed with the non-corrosive rim or facing *d*, which shuts against the rim *e*. The draft-door *c* is furnished with the non-corrosive rim *f*, which shuts against the facing *g*. A rim or facing of brass can be made to fit much closer than any cast-iron door, even if no rusting or corroding should take place.

Thus it will be seen that by my invention all possibility of the escape of gas is obviated, and the fire is perfectly regulated by one draft or opening below the grate.

I do not confine myself to the particular-shaped doors described in the drawing, but propose to use, in combination with my invention, any common opening or door now in general use.

Having thus fully described my invention, what I claim and desire to secure by Letters Patent, is—

A door, valve, slides, or other device for affording an opening below the grate of a stove or furnace when faced around the edge with brass or other non-corrosive metal, as above described, so that the said metal may close tightly against a similar facing upon the stove or furnace, for the purposes hereinbefore set forth.

DAVID N. MARTIN.

Witnesses:

JOSEPH A. FROST,

H. NASON LONGFELLOW.